Sept. 4, 1956 D. E. FOLEY ET AL 2,761,896

TELEGRAPH REPEATER SYSTEM

Filed Oct. 28, 1952 2 Sheets-Sheet 1

INVENTORS: D. E. FOLEY
F. H. HANLEY

BY John E. Cassidy

ATTORNEY

INVENTORS: D. E. FOLEY
F. H. HANLEY
BY
John E. Cassidy
ATTORNEY

United States Patent Office 2,761,896

Patented Sept. 4, 1956

2,761,896

TELEGRAPH REPEATER SYSTEM

Daniel Elmore Foley, Nutley, and Frank Harold Hanley, Butler, N. J., assignors to American Telephone and Telegraph Company, a corporation of New York Application October 28, 1952, Serial No. 317,334

6 Claims. (Cl. 178—73)

The present application is a continuation in part of application Serial No. 174,676, filed July 19, 1950, now abandoned, and claim is made to all equitable and legal rights derivable therefrom.

The present invention relates to telegraph repeater systems and more particularly to an arrangement whereunder a single regenerative repeater unit may be interconnected through a new circuit described herein and called hereinafter a director circuit so that the single regenerative unit will serve to regenerate signals passing in each direction through a half-duplex interconnection such as through trunk circuits interconnected at a teletypewriter switchboard or telegraph line circuits interconnected through a telegraph test board or telegraph service board. Formerly, two regenerative repeater units, one for each direction, were required for this service.

As heretofore arranged in half-duplex teletypewriter switchboard service, for instance, two regenerative repeater units were provided, one for regenerating the signals for each direction of transmission. The differences in the switching arrangements between the circuits as heretofore arranged and the present circuits may be understood from the following.

Let it be assumed that a calling teletypewriter subscriber in New York calls a subscribed in Los Angeles and that the call is routed through the Chicago teletypewriter toll switching station and further that regeneration is required. Instead of using a single toll cord circuit to interconnect the New York to Chicago trunk directly to the Chicago to Los Angeles trunk, as would be the case if regeneration were not required, the Chicago toll operator heretofore employed a first teletypewriter cord circuit repeater to connect the incoming trunk from New York to a regenerative repeater coupling circuit, which circuit would extend into the input of a first regenerative repeater unit. The output of the first regenerative repeater unit would extend through the regenerative repeater coupling unit to a second teletypewriter cord circuit repeater, which would in turn be patched to the Los Angeles trunk. Signals originating in New York would be regenerated in the first regenerative repeater unit before retransmission to Los Angeles. Service is on a half-duplex basis, that is, it is possible to transmit in only one direction at a time. In order to regenerate the signals originating in Los Angeles before transmission to New York another regenerative unit was furnished. The regenerative coupling unit was arranged so that signals incoming from Los Angeles through the second teletypewriter cord circuit passed into the regenerative repeater coupling circuit to the input of a second regenerative repeater unit. The output of the second regenerative repeater unit passed through the coupling circuit and through the first teletypewriter cord circuit repeater and over the trunk to New York.

In the present arrangement a single regenerative repeater unit is employed to regenerate the signals in both directions. On such a call, on which regeneration is required, two teletypewriter cord circuit repeaters and a regenerator coupling circuit are employed in the same manner as formerly. However, the coupling circuit is arranged to perform an added function, namely, to direct the signals incoming from either direction into the input of a single regenerator unit and to direct the output of the single regenerator unit into the opposite circuit from which the signals are being received. In order to perform this directing function a switch which discriminates between the sources from which the signals are being received and directs them to the opposite circuit is required and that is the added function of the new coupling circuit or director circuit as it is presently named in recognition of its directing function.

A regenerative repeater unit is an expensive piece of apparatus. It is most widely used at present in teletypewriter switchboard service and to a lesser extent in private line service and the present invention will reduce the total number required by about one-half.

In the case of the interconnection of two telegraph line circuits in private wire service, as distinguished from trunk circuits in teletypewriter switchboard service, the two telegraph lines are connected directly through the single director circuit to the single regenerative repeater unit, no cord circuits being employed, and the operation of the single director circuit and the single regenerative repeater unit is essentially the same as for a teletypewriter switchboard connection.

The invention may be understood from the following description when read with reference to the associated drawings which taken together disclose preferred embodiments in which the invention is presently incorporated. It is to be understood, however, that practice of the invention is not limited to the specific embodiments disclosed herein but the invention may be practiced with other embodiments which will be readily suggested to those skilled in the art by the following disclosure.

In the following description where values of constants are cited it is to be understood that the values are cited by way of example as an aid in understanding the invention and the operation of the circuit of the invention is not limited to elements having constants of the cited values.

Figure 1:
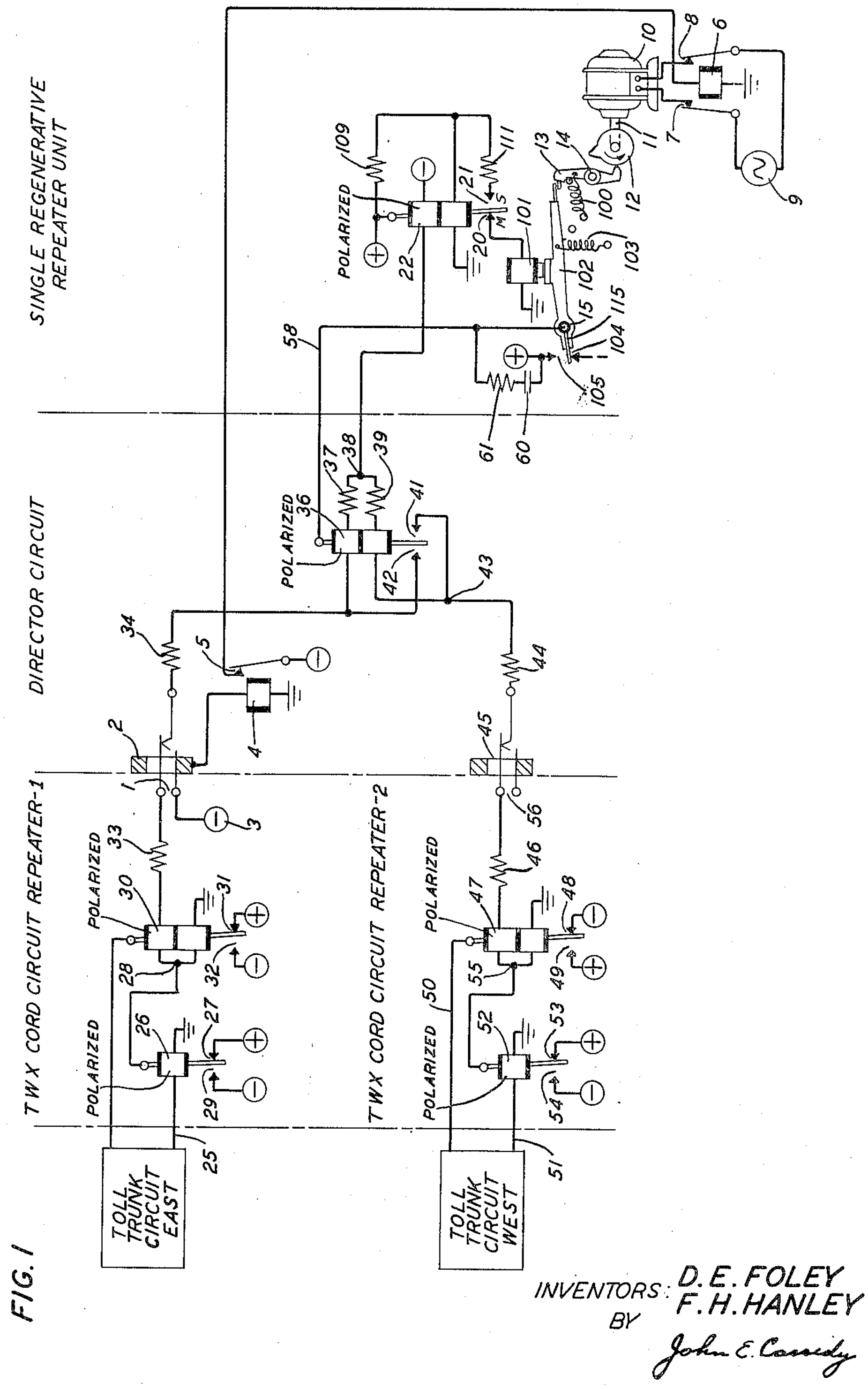
Fig. 1 is an embodiment of the invention arranged for teletypewriter exchange service.

Refer now to Fig. 1 which shows at the left, a rectangle representing a toll trunk circuit to the east and a second rectangle representing a toll trunk circuit to the west. The elements of two teletypewriter switchboard or TWX cord circuit repeaters, 1 and 2, essential to an understanding of the invention are shown to the right of the trunk circuits. Each cord circuit repeater is connected at its left-hand end to a trunk. The upper or cord circuit repeater 1 and the lower or cord circuit repeater 2 are connected to the east and west toll trunk, respectively. Next in order toward the right on the drawing is shown a single director circuit to which the right-hand end of each of the cord circuits is connected. At the far right on the drawing is shown schematically a single regenerative repeater unit to which the right-hand end of the director circuit is connected.

Signals generated in TWX cord circuit repeater 1, in response to signals received from its connected east trunk, pass into the director circuit. The director circuit directs them to the input of the single regenerative repeater unit. Regenerated signals from the output of the regenerator are directed by the director circuit to TWX cord circuit repeater 2. Signals originating in the west trunk pass through TWX cord circuit repeater 2 and through the director circuit into the input of the single regenerative repeater unit. The output of the single regenerative repeater unit is then directed through TWX cord circuit repeater 1 to the connected east trunk. The single switch in the directing circuit, in the present embodiment, is a polar relay which has two control or operating elements namely the first and second operating winding connected to a first and a second telegraph channel. The switch has two switch elements responsive to the operating winding controls, namely, a first and a second relay contact, which directs the outgoing regenerated signals toward the opposite telegraph signal channel from which they were received.

Regenerative repeaters are well known in the art. Their function is to reshape and retime distorted telegraph or teletypewriter signals. To do this, advantage is taken of the fact that whereas the beginnings and ends of such signals may be distorted, the center portion affords at least a reliable indication of the nature of the signal, that is to say, in the case of current-no-current signals, the center portion of a signal, if a current signal, will have sufficient amplitude to operate a sensitive magnetic relay, for instance. By delaying the sensing of the nature of a signal element until its middle portion arrives and then sensing it, it is possible through the use of an electromechanical transmitter, or an electronic regenerative repeater which transmits signals of standard duration, at the expense of a delay of approximately one-half a signal element, to transmit a signal element of standard duration and perfectly shaped. Each incoming signal element, therefore, is sensed at its middle portion and a signal element of standard duration and perfect shape is then transmitted. It is to be understood, of course, that each of the signal elements of a regenerated train of signal elements will be of standard duration. The first half of each regenerated signal element will be transmitted after sensing while the latter half of the signal to which it corresponds is being received and the second half of each regenerated signal element will be transmitted while the first half of the succeeding incoming signal is being received and before it is sensed to determine the nature of the succeeding signal element.

For a detailed description of the operation of a regenerative repeater of the electromechanical type, see W. T. Rea Patent 2,337,496, issued December 21, 1943, or W. J. Zenner Patent 2,105,173, issued January 11, 1938, and for an electronic regenerative repeater, see W. T. Rea Patent 2,487,181, issued November 8, 1949, which are incorporated herein by reference as though fully set forth herein. The present invention is operative with the regenerative repeaters described in the foregoing patents as well as with other type of regenerative repeaters.

To consider now the detailed operation of the circuit per Fig. 1, when the plug 1 of TWX cord circuit repeater 1 is connected to jack 2 of the director circuit, battery 3 on the sleeve of plug 1 is connected through the sleeve of jack 2 and the winding of relay 4 to ground, operating relay 4 and closing contact 5. A circuit may then be traced from ground through the winding of relay 6, and contact 5 of relay 4 to battery, operating relay 6 and closing contacts 7 and 8. The closing of contacts 7 and 8 establishes a circuit from power source 9 through contacts 7 and 8 to motor 10, starting the motor of the regenerative repeater.

To anticipate, and to describe the regenerative repeater briefly, the motor 10 is coupled through shaft 11 and a friction clutch (not shown) to eccentric cam 12 which controls follower 13 which is pivoted at 14. The top portion of follower 13 is biased to the left by spring 100 and is actuated to the right by a projection on cam 12 which engages a projection on the bottom of follower 13 just before the middle portion of a signal element is impressed on receiving magnet 101 of the regenerator, releasing lever 102 which is pivoted at 15 and the right-hand portion of which then is free to assume an elevated position if magnet 101 is energized or a lower position, under the influence of spring 103, if it is not. Responsively, contact 104 is closed when the right-hand portion of lever 102 is elevated and contact 105 is closed when the right-hand portion of lever 102 is lowered. Immediately after the contact 104 or 105 is closed, follower 13 locks the right-hand end of lever 102, in its elevated or lower position, under the influence of spring 100 and maintains the lock for the duration of a standard signal element. Then, the cycle is repeated. When contact 105 is closed, for the spacing condition, positive battery is connected from the output of the regenerative repeater through armature 115 to conductor 58 and when contact 104 is closed for the marking condition, since there is no connection to contact 104, conductor 58 is open.

From the foregoing it will be apparent that the contact-controlling lever 102 of the regenerative repeater output is permitted to be actuated by the middle portion of an incoming signal element only, and is then locked in the position determined by the middle portion of the incoming signal element for the duration of a full signal element. Thus while signals transmitted from the regenerator contacts 104 and 105 are of standard duration, they are displaced and delayed by a fixed interval, equal to approximately one-half the duration of a signal element, from the time of reception of the corresponding signal element by regenerator receiving relay 22.

The armature of the polar regenerative receiving relay 22 is normally biased toward the right to tend to engage with its spacing contact 21 by the effect of current flowing from positive battery through resistor 109 and the bottom winding of relay 22 to ground, and the biasing current will be effective to actuate the armature of relay 22 to engage its spacing contact 21 when its effect is dominant over the counter effect of current flowing in the top winding of relay 22 which tends to actuate its armature to engage its marking contact 20 in a manner to be explained.

A marking signal incoming from the east trunk will impress positive battery on the left-hand end of conductor 25 in TWX cord circuit repeater 1 and the circuit extends through the winding of polar relay 26 to ground, actuating the armature of relay 26 to engage its marking contact 27. A circuit may then be traced from positive battery through marking contact 27 to junction 28 where it divides. One branch extends through the bottom or biasing winding of relay 30 to ground. The effect of current flowing in this path tends to actuate the armature of relay 30 toward the left to engage its spacing contact 32 but it is ineffective at present. The other branch of the circuit extending from junction 28 may be traced through the top winding of relay 30, resistance 33, tip of plug 1, tip of jack 2, resistance 34, top winding of polar relay 36, resistance 37, junction 38, and top winding of polar relay 22 to negative battery. The effect of the current flowing in the top winding of relay 30 is dominant over the effect of the current flowing in its bottom winding and is in a direction to hold the armature of relay 30 against its right-hand or marking contact 31. Current which, it will be assumed, is 20 milliamperes in magnitude will flow through the top winding of relay 36. The effect of this current is such that it tends to actuate the armature of relay 36 toward the left to engage its contact 42, but it will be ineffective for reasons to be explained hereinafter. The 20-milliampere current from cord circuit repeater 1 will flow through the top winding of relay 22.

For the marking condition, current from positive battery will flow from the west trunk through conductor 51 and the winding of polar relay 52 to ground, actuating the armature of relay 52 to engage with its right-hand or marking contact 53. A circuit may then be traced from positive battery through marking contact 53 to junction 55 where it divides. One branch extends through the bottom or biasing winding of polar relay 47 to ground. The effect of current flowing in this path tends to actuate the armature of relay 47 to engage its spacing contact 49, but is ineffective at present. From junction 55 the other branch of the circuit extends through the top winding of relay 47, resistance 46, tip of plug 56, tip of jack 45, resistance 44, bottom winding of relay 36, resistance 39, junction 38 and the top winding of relay 22 to negative battery. It will be assumed that current of 20 milliamperes flows in the path last traced. Its effect in the top winding of relay 47 is dominant over the opposing effect of current in the bottom winding of relay 47 and the armature of relay 47 is, therefore, maintained in engagement with marking contact 48 for the marking condition. The 20 milliamperes flowing in the bottom winding of relay 36 opposes the effect of the 20 milliamperes flowing in the upper winding of relay 36. The effects are equal and opposed and, therefore, the flow of the 20-milliampere current in the top and bottom windings of relay 36 will have no effect on the armature of relay 36 for the marking condition. The armature of relay 36 may float between the contacts, as indicated, or engage contact 41 or 42 for the marking condition of the system, and it will be without effect for reasons which will become apparent hereinafter.

The 20-milliampere current flowing in the top winding of relay 22 from cord circuit repeater 2 for the marking condition augments the effect of the 20-milliampere current flowing through the top winding of relay 22 from cord circuit repeater 1 for the marking condition. The effect of the combined 40-milliampere current in the top winding of relay 22 will be dominant over the counter effect of the 30-milliampere current in the bottom or biasing winding of relay 22 and the armature of relay 22, will, therefore, be actuated to engage its left-hand or marking contact 20, as shown, for the marking condition.

When the armature of relay 22 engages its left-hand or marking contact a circuit may be traced from positive battery through the armature and marking contact 20 of relay 22 and the winding of regenerative receiving magnet 101 to ground energizing the magnet which will have the effect of closing the regenerative repeater output marking contact 104, as explained, after the delay.

The armature of relay 36 is interconnected by conductor 58 to the armature 115 on lever 102. Attention is called to the fact that when the armature 115 of the regenerative repeater engages its marking contact 104, since there is no connection to contact 104, the circuit is open. For the marking condition of the system therefore, whether or not the armature of relay 36 engages contact 41, 42, or floats between them is immaterial.

It will now be assumed that the east trunk starts to transmit. In response to the first spacing signal element, the armature of relay 26 will be actuated to the left to engage its spacing contact 29. This substitutes negative battery for positive battery on the left-hand end of the circuit traced through the top winding of relays 30 and 36. Since the top winding of relay 22 is terminated in negative battery also, no current will flow through the top winding of relays 30 and 36. Further, no current will flow from cord circuit repeater 1 through the top winding of relay 22.

With respect to relay 30, since the polarity of the current flowing through its bottom winding is now reversed, its effect will maintain the armature of relay 30 in engagement with its marking contact 31. With respect to relay 36 the effect of the current flowing in its bottom winding will now be unopposed and its armature will be actuated under the influence of its bottom winding to engage its contact 41. With respect to relay 22, when the current in its upper winding is reduced to 20 mils, the effect of the 30-mil current in its lower or biasing winding becomes dominant and the armature of relay 22 is actuated to engage its spacing contact 21. This disconnects battery from the winding of magnet 101 deenergizing it for the spacing condition.

It will be assumed that the magnitude of resistor 109 is 4,000 ohms and the magnitude of resistor 111 is 6,000 ohms. When the armature of relay 22 engages its spacing contact 21, resistors 109 and 111 are connected in parallel, both in series with the bottom winding of relay 22. This increases the current in the bottom winding from 30 milliamperes to 50 milliamperes. Since the current in the top winding is 20 milliamperes and its effect is in the marking direction and the current in the bottom winding is 50 milliamperes and its effect is in the spacing direction the net effect is that of 30 milliamperes in a direction to lock the armature of relay 22 against its spacing contact 21.

After an interval equal approximately to one-half the duration of a signal element, follower 13 will release lever 102 which will thereupon be actuated by spring 103 so that armature 115 engages its spacing contact 105, connecting positive battery through contact 105, armature 115, conductor 58, contact 41, junction 43, resistance 44, tip of jack 45, tip of plug 56, resistance 46, top winding of relay 47, junction 55 and the armature and marking contact 53 of relay 52 to positive battery. Positive potential of equal magnitude is connected to each end of this path. In effect positive battery is connected directly to junction 43 so that no current flows through the top winding of relay 47. The effect of the current flowing in the bottom winding of relay 47 will actuate its armature to engage its spacing contact 49 thereby transmitting a spacing signal to the connected trunk.

While the spacing signal transmitted from contact 105 persists a path extends from junction 43 on which positive potential from contact 105 is impressed through the bottom winding of relay 36, resistance 39, junction 38 and the top winding of relay 22 to negative battery. This increases the current flowing in the bottom winding of relay 36 and in the top winding of relay 22 to 40 milliamperes, for instance. This locks the armature of relay 36 in engagement with its contact 41 for the duration of a standard full length spacing signal element being transmitted from contact 105 and prevents any interference with its transmission in the event that the armature of relay 26 is actuated to engage its contact 29 in response to the reception of a marking signal element while the latter half of the regenerated spacing signal is being transmitted.

During the transmission of the first half, approximately, of the spacing signal element from contact 105, the augmenting of the 20-milliampere current flowing in the bottom winding of relay 36 with 20 additional milliamperes, as described, is unnecessary, because since there is no current flowing in the top winding of relay 36, as the last half of a spacing signal element is being received from cord circuit repeater 1 and no current flows in the top winding for this condition, the normal 20-milliampere current flowing in the bottom winding of relay 36 would be more than adequate to hold the armature of relay 36 in engagement with contact 41. However, before the delayed spacing signal has been completely transmitted from contact 105, in the event that the succeeding signal element received from cord circuit repeater 1 is a marking signal element, the armature of relay 26 will reengage contact 27. Then 20 milliamperes will flow again through the top winding of relay 36 in a direction such that its effect tends to actuate its armature to engage contact 42. The armature of relay 36 must be maintained on contact 41, however, until the transmission of the delayed spacing signal element from contact 105 is completed in order to properly direct it into the trunk to the west. The now augmented current of 40 milliamperes, the effect of which is tending to maintain the armature of relay 36 in engagement with contact 41 will be effective, therefore, to prevent a succeeding marking signal element from cord circuit repeater 1 from preventing the transmission of the full length delayed spacing signal element from contact 105. The augmenting of the 20-milliampere current in the top winding of relay 22 with 20 additional milliamperes during the interval while the first half of the spacing signal element is being transmitted removes the locking current in relay 22 by reducing the effective spacing current from 30 milliamperes to 10 milliamperes or the difference between 50 milliamperes spacing and 40 milliamperes marking, rather than 50 milliamperes spacing and 20 milliamperes marking.

If the next succeeding signal element receiving from cord circuit repeater 1 is a marking signal element, current of 20 milliamperes will flow through the top winding of relay 36. Its effect will be in a direction to tend to actuate the armature of relay 36 to engage its contact 42. As long as the regenerated spacing signal element continues to be transmitted from contact 105, however, the armature of relay 36 will be maintained in engagement with its contact 41, due to the dominant effect of the 40 milliamperes flowing through the bottom winding of relay 36, throughout the interval while the delayed spacing signal is being transmitted from contact 105.

During the interval while a succeeding marking signal element is incoming from cord circuit repeater 1 and the latter half of an outgoing regenerated spacing signal element is being transmitted from contact 105, 40 milliamperes will flow through the bottom winding of relay 36 and 20 milliamperes will flow through its top winding. These two currents will combine and flow through the top winding of relay 22. Their combined effect of 60 milliamperes tends to actuate the armature of relay 22 to engage its marking contact 20 and the magnitude of the effect is dominant over the counter or biasing effect of the 50 milliamperes in the bottom winding of relay 22.

At the instant that the armature of relay 22 leaves its spacing contact 21, the shunt path through resistance 111 is disconnected and the current through the bottom or biasing winding of relay 22 is reduced from 50 milliamperes to 30 milliamperes. This increases the effective marking current from 10 milliamperes to 30 milliamperes or from 60 minus 50 to 60 minus 30 milliamperes. This locks the armature of relay 22 to its marking contact 20. When the armature of relay 22 reengages its contact 20, it again energizes magnet 101. The follower 13 will not be released by cam 12 until after a full length spacing signal element is transmitted, however. At the termination of the transmission of the delayed spacing signal element, marking contact 104 of the regenerator will again be closed to transmit the marking signal element to the west trunk circuit. As soon as armature 115 breaks from spacing contact 105, the potential impressed through contact 105 on terminal 43 will be disconnected. The current conditions prevailing in the top and bottom winding of relay 36 at the beginning will be restored, namely 20 milliamperes flowing in each winding of relay 36 with their effects opposing, or a net effect of zero. No matter what position is assumed by the armature of relay 36 during the transmission of the marking signal element from contact 104, it is immaterial, as there is nothing connected to contact 104 during a marking interval.

During the reception of the latter half of a marking signal element from cord circuit repeater 1, a current of 20 milliamperes will continue to flow in each of the windings of relay 36 and their effects will continue to be opposed. The armature of relay 36 may engage either contact 41 or 42 or float between them. However, for this condition as has been explained, the armature 115 of the regenerative repeater will be locked on its marking contact 104 where it will remain for the duration of a full marking signal element. Cord circuit repeater 2 will assume the marking condition and a marking signal element will be transmitted therefrom to the connected trunk circuit.

When spacing signal elements succeed each other from repeater 1, the armature of relay 36 will be locked against contact 41 throughout the interval that they are being transmitted from contact 105.

The manner in which the system operates when signals are received from the west trunk through cord circuit repeater 2 corresponds to that described in the foregoing for their reception from the east trunk through cord circuit repeater 1. During the interval while spacing signals are being received from cord circuit repeater 2 and while they are being transmitted from regenerator output contacts 104 and 105, the armature of relay 36 will be maintained in engagement with contact 42 which, it will be observed, is connected in parallel to the main transmission conductor of cord circuit repeater 1 and the top winding of relay 36, in a manner corresponding to that in which contact 41 is connected to the main transmission conductor to cord circuit repeater 2 and to the bottom winding of relay 36, so as to perform the corresponding function of directing the output of the regenerator to the opposite cord circuit repeater from which the signals are being received, in this case to cord circuit repeater 1, and to maintain the armature of relay 36 locked to contact 42, as a result of augmented current in the top winding of relay 36, from contact 105, during the interval while the first half of a succeeding marking signal element is being received from repeater 2.

The condenser 60 and resistance 61 connected in series are arranged as a contact protecting shunt for contact 105 and serve also as a wave shaper to shape the wave of the transmitted signal to eliminate marking bias caused by travel time of armature 115.

For transmission in either direction, as a practical matter, if relay 36 is unbiased, and otherwise in good adjustment, its armature will be operated only once for each change in direction of transmission, that is, it will remain on the contact to which it is first operated in response to a change in the direction of transmission, say from east to west or from west to east, until the direction of transmission is reversed.

Figure 2:
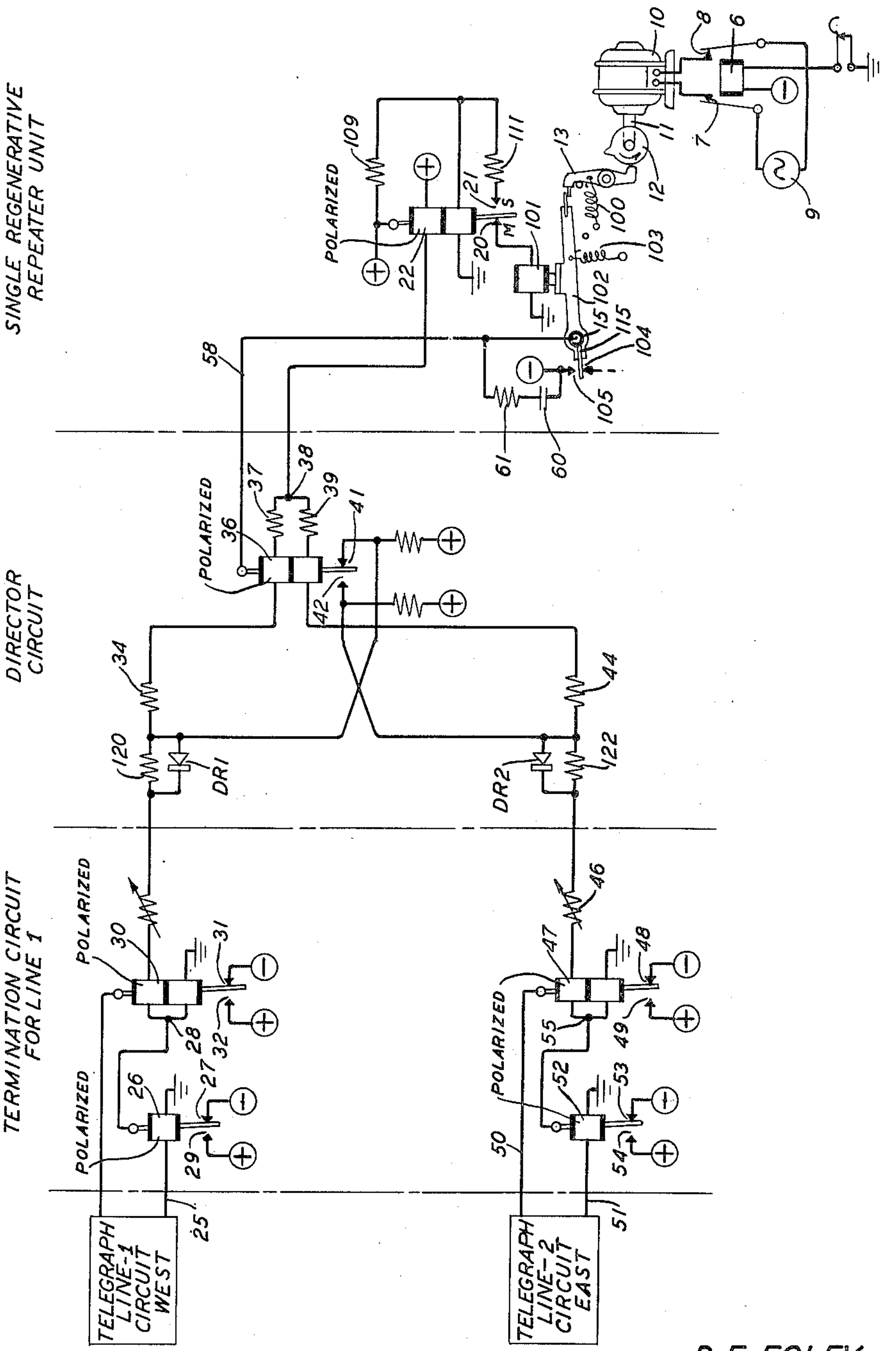
Fig. 2 is an embodiment of the invention arranged for private line service.

Refer now to Fig. 2. Fig. 2 shows the arrangement of the circuits when they are connected for private line service as distinguished from teletypewriter switchboard service as in Fig. 1.

In the arrangement per Fig. 2, a telegraph line, line 1, say from the west, indicated by a rectangle at the upper left of Fig. 2 is connected through a terminating circuit and a director circuit to the single regenerative unit. Another telegraph line, line 2 indicated by a rectangle shown at the lower left is similarly connected through an individual terminating circuit and the common director circuit to the single regenerative unit.

Except for minor differences the circuit connections and operation is identical with that of Fig. 1. One difference is that the polarity of the batteries connected to the marking and spacing contacts of relays 26 and 52 in Fig. 2 is reversed from that connected to the corresponding relays in Fig. 1. Another is that the polarity of the batteries connected to the right-hand terminal of the top winding of relay 22 in Fig. 2 is opposite from that of the corresponding connection in Fig. 1. Another difference is that battery is connected to the contacts of relay 36. These changes are made to match the difference in battery poling employed in private line operation in a well-known large telegraph plant. Another difference is the employment of the parallel combination of non-linear resistance DR1, which may be, for instance, a dry rectifier, and resistor 120 in series with line 1 and a corresponding parallel circuit comprising non-linear resistance DR2 and resistor 122 in series with line 2. These are provided so that the magnitude of the resistance in series with the repeater receiving from the regenerative unit may be the same for marking as for spacing signals.

The operation of the circuit per Fig. 2 is practically identical with that described for the operation of Fig. 1.

One of the important features of the present invention is the locking feature of the receiving relay 22 for both marks and spaces which provides the equivalent of "point selection" because once the armature of receiving relay 22 is operated from one contact to the other it is locked to the operated contact until the output circuit of the regenerative repeater is locked by follower 13. This feature increases the distortion tolerance of the regenerative unit, because after the armature of relay 22 locks, it will not be affected by distortion of the incoming signals received in its upper winding. This increases the field of application of the present invention to include circuits having a larger amount of incoming signal distortion than would otherwise be possible.

What is claimed is:

1. In a half-duplex teletypewriter switching system, a first and a second telegraph channel interconnected through a first and a second telegraph cord circuit repeater, respectively, and a single director circuit to a single regenerative repeater unit, said director circuit having a single polar relay and a first and a second winding thereon in series with said first and said second channel, respectively, said relay responsive to signals incoming from either channel to direct the output of said unit to the other channel.

2. In a half-duplex teletypewriter switching system, a first and a second cord circuit repeater, a single regenerative repeater unit, a single director circuit intermediate said repeaters and said unit and means in said director circuit, comprising a single polar relay having a first and a second winding connected individually to said first and said second cord circuit repeater, respectively, responsive to signals incoming from either of said cord circuit repeaters to direct the output of said regenerator unit to the other of said cord circuit repeaters.

3. In a half-duplex telegraph switching system, two telegraph channels interconnected through a single regenerative repeater unit, a single directing circuit intermediate said channels and said unit, a single switching element in said directing circuit having each of a pair of switch operating elements connected individually to said channels and each of a pair of switch elements responsively connected to one or the other of said channels.

4. In a half-duplex teletypewriter switching system, a first trunk circuit connected through a first cord circuit repeater and a single directing circuit to a single regenerative repeater unit, a second trunk circuit connected through a second cord circuit repeater and said single directing circuit to said single regenerative repeater unit, and switching means in said directing unit responsive to signals incoming from one or the other of said trunks to direct the output of said regenerator unit to the opposite trunk, said switching means comprising a single switching device having a first control thereon connected directly to and directly responsive to said first cord circuit repeater, and having a second control thereon connected directly to and directly responsive to said second cord circuit repeater.

5. In a half-duplex telegraph system, a first and a second telegraph channel, a single directing relay having a first and a second operating winding, an armature and a first and a second contact thereon, a single regenerative repeater unit having an input and an output circuit, said first and said second channels connected to said first and said second windings respectively, said windings both connected to said input circuit, said output circuit connected through said armature and said first and said second contacts to said first and said second channels respectively, said relay responsive to a signal condition from either of said channels to switch said output circuit to the other of said channels.

6. A telegraph regenerative repeater circuit, a signal regenerator therein, a polar receiving relay controlling said regenerator, an armature on said relay actuable to a first and a second position, a first locking circuit connected to said relay responsive to the actuation of said armature to said first position, for locking said armature in said first position, a second locking circuit connected to said relay responsive to the actuation of said armature to said second position, for locking said armature in said second position, to prevent false operation of said armature due to distorted signals received by said relay and a telegraph signal receiving device in said regenerator, said device connected directly to said armature when said armature is in one of its two positions.

References Cited in the file of this patent

UNITED STATES PATENTS

| | | |
|---|---|---|
| 1,472,463 | Eaves | Oct. 30, 1923 |
| 2,055,575 | Herman | Sept. 29, 1936 |
| 2,089,838 | O'Meara | Aug. 10, 1937 |
| 2,337,496 | Rea | Dec. 21, 1943 |
| 2,353,392 | Crago | July 11, 1944 |
| 2,427,719 | Exner | Sept. 23, 1947 |